United States Patent
Gerresheim et al.

(10) Patent No.: US 6,889,733 B2
(45) Date of Patent: May 10, 2005

(54) VEHICLE TIRE HAVING PROFILED TREAD INCLUDING BLOCKS

(75) Inventors: Manfred Gerresheim, Oberthausen (DE); Klaus Doring, Lengenselbold (DE); Christof Mulhause, Alzenau (DE)

(73) Assignee: Dunlop GmbH, Hanau (DE)

(*) Notice: Subject to any disclaimer, the term of this patent is extended or adjusted under 35 U.S.C. 154(b) by 142 days.

(21) Appl. No.: 09/806,824

(22) PCT Filed: Jul. 20, 2000

(86) PCT No.: PCT/EP00/06919

§ 371 (c)(1),
(2), (4) Date: Aug. 3, 2001

(87) PCT Pub. No.: WO01/10657

PCT Pub. Date: Feb. 15, 2001

(65) Prior Publication Data

US 2002/0166615 A1 Nov. 14, 2002

(30) Foreign Application Priority Data

Aug. 5, 1999 (DE) .......................................... 199 37 067

(51) Int. Cl.[7] .......................... B60C 11/03; B60C 11/13; B60C 103/00; B60C 107/00
(52) U.S. Cl. ............................ 152/209.15; 152/209.18; 152/209.24; 152/209.25
(58) Field of Search ....................... 152/209.15, 209.18, 152/209.22, 209.25, 209.24

(56) References Cited

U.S. PATENT DOCUMENTS

| 4,722,378 | A | * | 2/1988 | Carolla et al. |
| 5,127,455 | A | * | 7/1992 | Remick |
| 5,358,022 | A | | 10/1994 | Glover et al. |
| 5,450,885 | A | * | 9/1995 | Hanya .................... 152/209.26 |
| 5,690,761 | A | * | 11/1997 | Masaoka |

FOREIGN PATENT DOCUMENTS

| DE | 4107051 | | 9/1992 |
| EP | 367557 | * | 5/1990 |
| EP | 591125 | * | 4/1994 |
| EP | 602989 | * | 6/1994 |
| EP | 0652119 A1 | | 5/1995 |
| EP | 0925957 A2 | | 6/1999 |
| GB | 1549347 | * | 8/1979 |
| JP | 3-32907 | * | 2/1991 |
| JP | 03178809 | | 8/1991 |
| JP | 6-166304 | * | 6/1994 |
| JP | 7-186623 | * | 7/1995 |
| JP | 09002019 | | 1/1997 |
| JP | 10203118 | | 8/1998 |

* cited by examiner

Primary Examiner—Steven D. Maki
(74) Attorney, Agent, or Firm—Birch, Stewart, Kolasch & Birch, LLP

(57) ABSTRACT

A vehicle having a profiled tread, having tread blocks (1) in at least some regions of its circumference, characterized in that for at least some of the tread blocks (1) at least the tread block edges (2) running into the tire contact patch (11) and extending at an angle to the central plane of the tire are lowered over their entire length with respect to the central plateau (3) of the respective tread block (1).

10 Claims, 5 Drawing Sheets

VEHICLE TIRE HAVING PROFILED TREAD INCLUDING BLOCKS

TECHNICAL FIELDS

The invention relates to a vehicle tire having a profiled tread, having tread blocks in at least some regions of its circumference.

BACKGROUND ART

It is known, in particular for so-called block treads, but also for treads having a relatively large proportion of tread blocks with a surface radius based on the tire diameter or the mould radius, that irregular wear in the form of heel and toe wear frequently occurs. This heel and toe wear can occur in a particularly severe manner in treads used on the driven axles of trucks. While known tread block designs having correspondingly sharp tread block edges produce good grip values, loud rolling noise has to be accepted in addition to the disadvantage or irregular wear, and the small compression zone occurring at the relevant tread block leads to high contact pressure and to tread deformation in the leading edge, which can, in turn, result in higher flexing work, an increase in temperature, unstable rolling and a lower service life.

It is already known from EP 0 895 876 A2 to reduce these disadvantages by designing the corner regions of the tread blocks in a chamfered manner and thus to reduce the tread block height in the corner regions. While this measure can provide certain improvements, it does not solve the problems listed above to the required extent.

It is the object of the present invention to provide in a vehicle pneumatic tire having a profiled tread, and tread blocks in at least some regions of its circumference, a tread block design which avoids irregular wear in the form of heel and toe wear, leads to a substantial reduction in rolling noise, reduces the rolling resistance and increases the service life and so the running performance of the tire.

DISCLOSURE OF THE INVENTION

According to the present invention this object is essentially solved by providing at least some of the tread blocks by at least the tread block edges running into the tire contact patch and extending at an angle to the central plane of the tire being lowered over their entire length with respect to the central plateau of the respective tread block.

The contour of the tread block boundary surface or surfaces extending from the start of the lowering preferably up to the base of the groove preferably extends in section planes parallel to the central plane of the tire in the form of an extended S-curve and, in accordance with a particularly advantageous embodiment, in accordance with an exponential function.

This design of treads can be used in the best possible manner for all purposes by, in particular, the selection of optimised exponential functions, with it being of particular importance that in accordance with the invention and in contrast to known measures that the tread design is executed in an optimum manner right from the groove base, with the parameters of the exponential function being capable of being selected so that both a directional dependence of the tread on the running direction and a lack of directional dependence of the tread on the running direction result.

BRIEF DESCRIPTION OF DRAWINGS

Particularly advantageous features and aspects of the invention are given in the dependent claims and are described with reference to embodiments with reference to the drawings in which:

MODE FOR CARRYING OUT THE INVENTION

Figure 1:
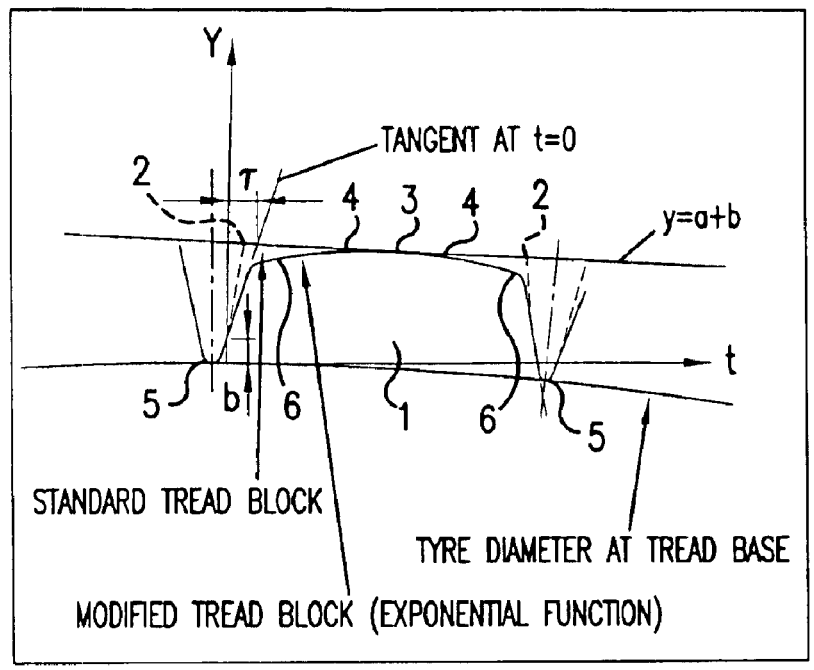
FIG. 1 shows a schematic representation to explain the tread modification in accordance with the invention in respect to a standard tread profile.

FIG. 1 shows, in a co-ordinate system having a Y axis corresponding to the tread depth and a t axis corresponding to the tread block length, a tread block 1, which is shown starting from the tread base as a standard tread block in the form of a broken line and in a solid line as a tread block in accordance with the invention.

The standard tread block has sharp-edged tread block edges 2 which lead to high rolling noise in operation. Due to the edged or sharp-edged design of conventional tread blocks, a small compression zone is produced in the edge region 2 which leads to high contact pressure and tread deformation in the leading edge. Due to the high flexing work which then occurs and to the associated increase in temperature, decreases in service life result and, furthermore, uneven rolling behaviour can occur. It has already been emphasised that with such a tread block design the good grip has to be acquired at the expense of the so-called heel and toe wear.

The tread block 1 designed in accordance with the invention and shown by solid lines differs from the standard tread block above all by the fact that the tread block edges 2 are lowered over their entire length with respect of the central plateau 3 and the contour of the tread block boundary surface 6 extending from the start 4 of the lowering, preferably up to the groove base 5, extends in section planes parallel to the central plane of the tire in the form of an extended S-curve an preferably and in accordance with the representation in FIG. 1 in accordance with an exponential function, i.e. the tread design is designed in an optimum manner right from the groove base.

FIG. 1 shows the general case of the tread block design in accordance with the invention, in accordance with which the start of the tread block boundary surface 6 running in accordance with an exponential function can also be varied with respect to the tread base, as is shown by the parameter b.

The exponential function relating to this general case can be given as follows:

$$Y = a(1 - e^{-t/\tau}) + b$$

The value $\tau$ is given by the distance of the intersection of the tangent at the tread block boundary surface 6 at $t=0$ and the Y axis.

Figure 2:
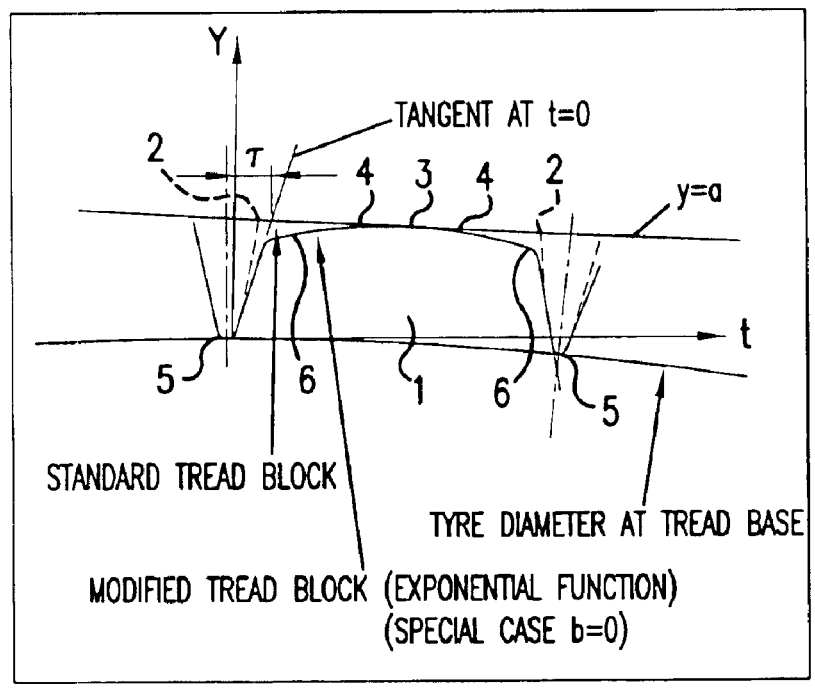
FIG. 2 shows a representation of a special case of FIG. 1.

The representation in FIG. 2 corresponds essentially to the representation of FIG. 1; however, it relates to the special case of $b=0$, i.e. the special shape of the tread block boundary surface designed in accordance with the invention extending up to the groove base 5.

The leading and trailing boundary surfaces 6 of the tread blocks can have the same or different designs with regard to their shapes and/or inclinations. The trailing boundary surfaces are preferably steeper.

In addition to the predominantly desired largest possible elimination of heel and toe wear, the design of tread blocks in accordance with the invention also achieves a high reduction in rolling noise and a reduction in the rolling resistance. Due to the shape of the tread block boundary surfaces 6, a relatively large compression zone is achieved which, in turn, leads to a low contact pressure with low tread deformation in the leading edge. This results in a reduction in flexing work and temperature so that the service life and the running performance is also increased with a good wear pattern. Another advantage which must be mentioned is that the design allows both a reduction in groove cracking and a minimisation of the block/tread striking contact to be achieved.

Figure 3:
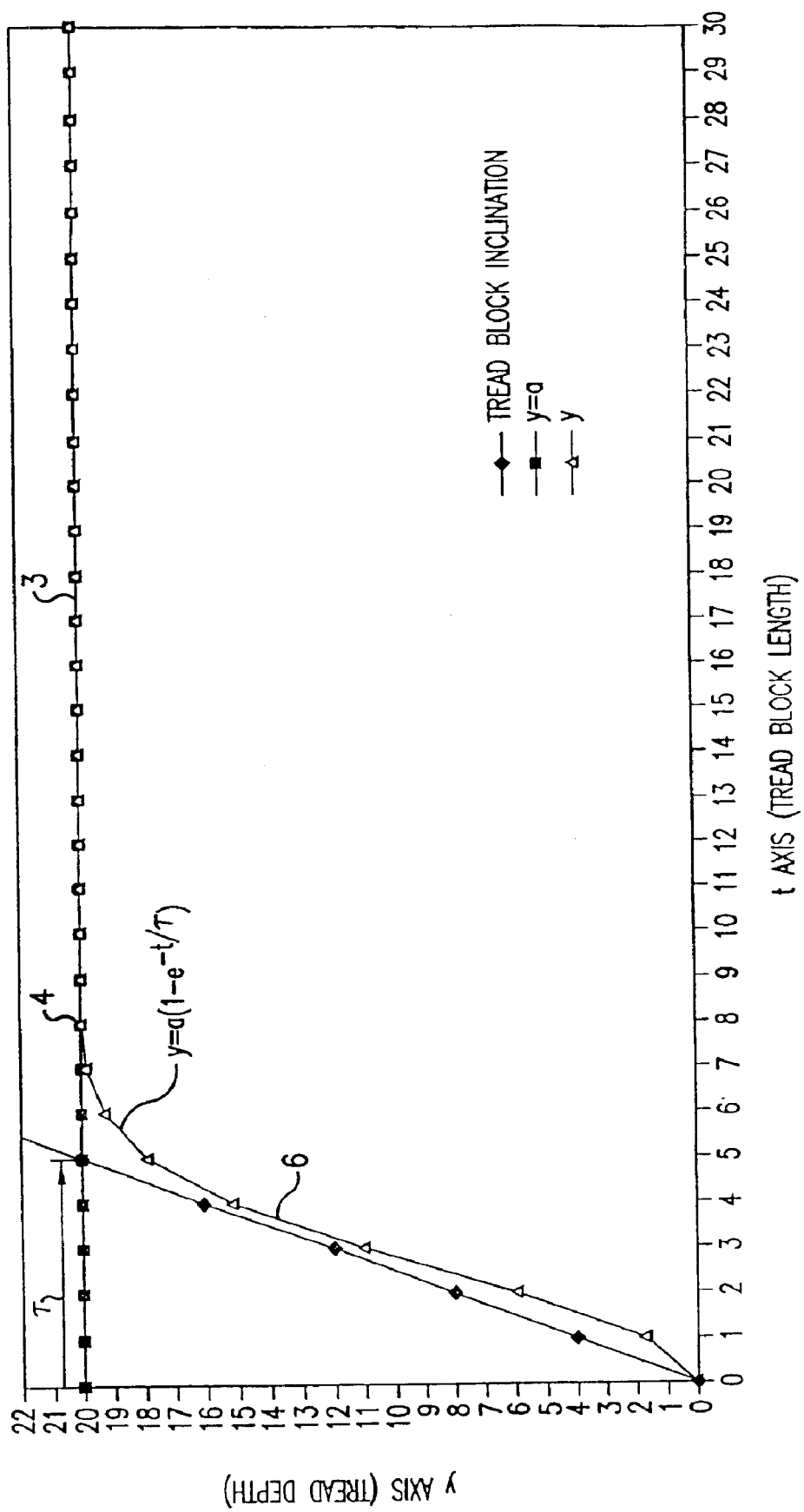
FIG. 3 shows a detailed representation of an exponential function for tread optimisation in accordance with the invention.

FIG. 3 shows in detail, in a co-ordinate system having the tread depth shown on the Y axis and the tread block length shown in the t axis, the shape of an exponential function for the optimisation of treads, with the tread block chamfering of a standard tread block being shown as marked with rectangles and with the shape of a tread block boundary surface 6 in accordance with the invention being entered in relation thereto and marked with triangles. It has already been pointed out that any profile can be optimised by means of the variables t, a, b and $\tau$ with regard to the already mentioned advantages which can be aimed at specifically in an individual case. This can be done both in the circumferential or lateral direction or in a combination of both directions. Using these design possibilities, a rectangular or also a trapezoid tread block plateau 3 can result between the start of the leading and the trailing edge lowerings in an elevated view.

It can be of special advantage if the depth of the grooves separating the tread blocks from one another in the direction of the tire circumference is selected differently in a pre-determinable repetition sequence, in particular if alternating grooves of full depth and half depth are provided. Such a design primarily has a positive effect in special uses of the tires with corresponding treads in the construction area, in stone quarries and, for example, also on refuse collection vehicles.

Figure 4:
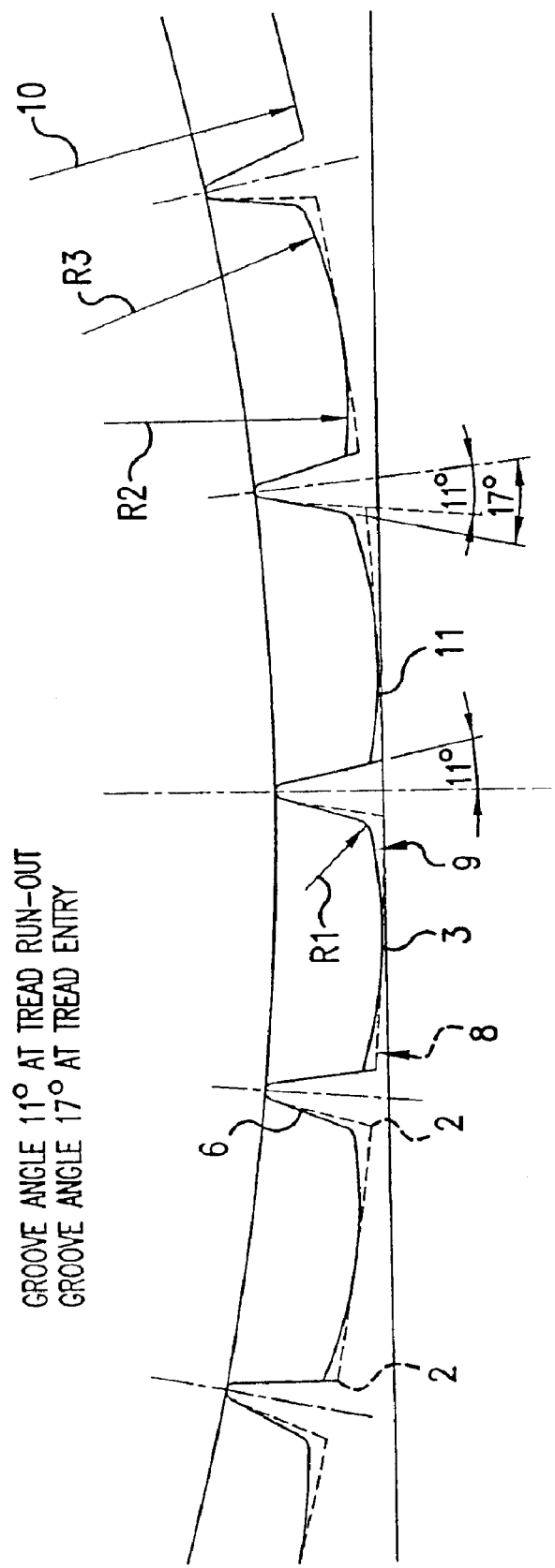
FIGS. 4, 5 and 6 show schematic representations of various aspects of tread block designs in the outer shoulder of tires.

FIG. 4 shows a first aspect of a tread design in the outer shoulder of a vehicle tire, with the drawn-in groove angle at the leading edge of the tread, i.e. as the tread runs into the tire contact patch 11, being 17° in the tread blocks 9 modified in accordance with the invention, in comparison to the standard tread block 8 and 11° at the trailing edge of the tread. The mould radius is indicated here with the reference numeral 10.

With this tread design, it is the lowering of the tread block edges in comparison to the standard tread block which is important, with this lowering being effected over the entire width of the tread block.

The type of lowering, or design of the tread block boundary surfaces 6, is effected here so that the tread block boundary surface 6 at the tread entry is composed of a flat inclined surface and a surface curved in accordance with a pre-determinable radius which then merges into the central plateau 3. In the embodiment according to FIG. 4, at the tread run-out, the transition between the flat tread block boundary surface starting from the groove base and the surface running in accordance with a radius and leading to the central plateau has an edged form.

Figure 5:
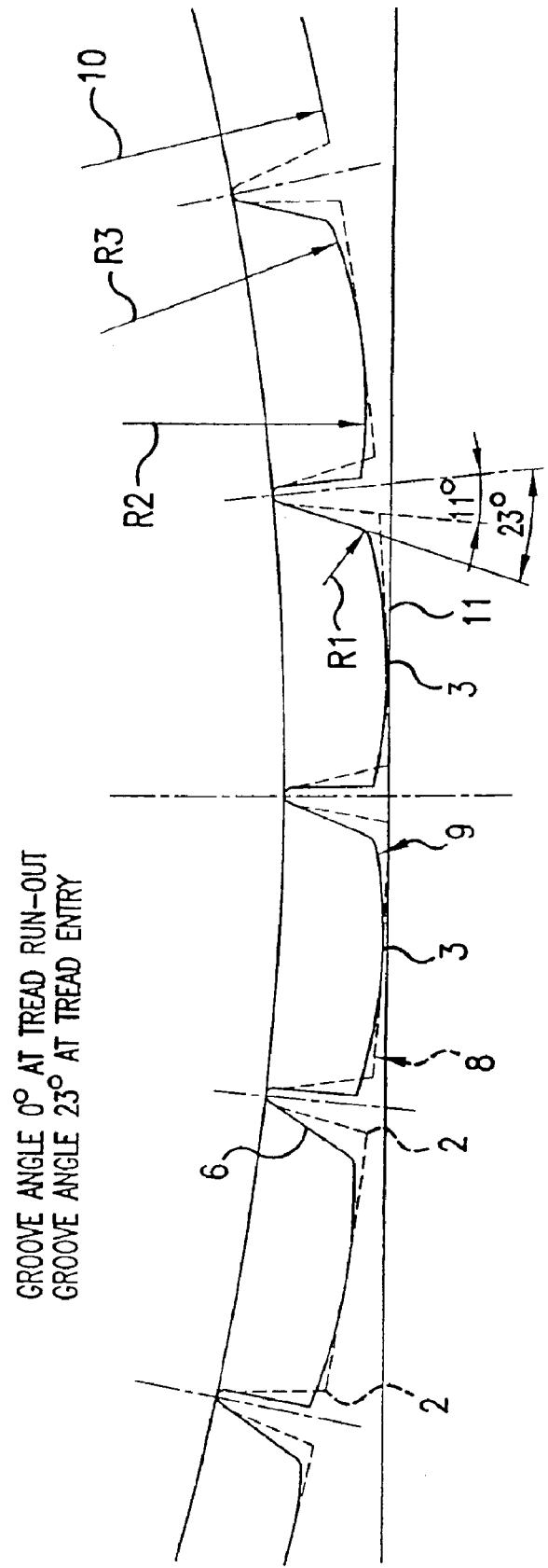

The embodiment of FIG. 5 essentially differs from the embodiment of FIG. 4 by different grooves angles at the tread entry and the tread run-out, with the special feature to be seen in the combination of a relatively large tread entry angle with a groove angle of 0° at the tread run-out. However, in this design, the tread edges of the tread block modified in accordance with the invention are also lowered relative to the tread edges of the standard tread block.

Figure 6:
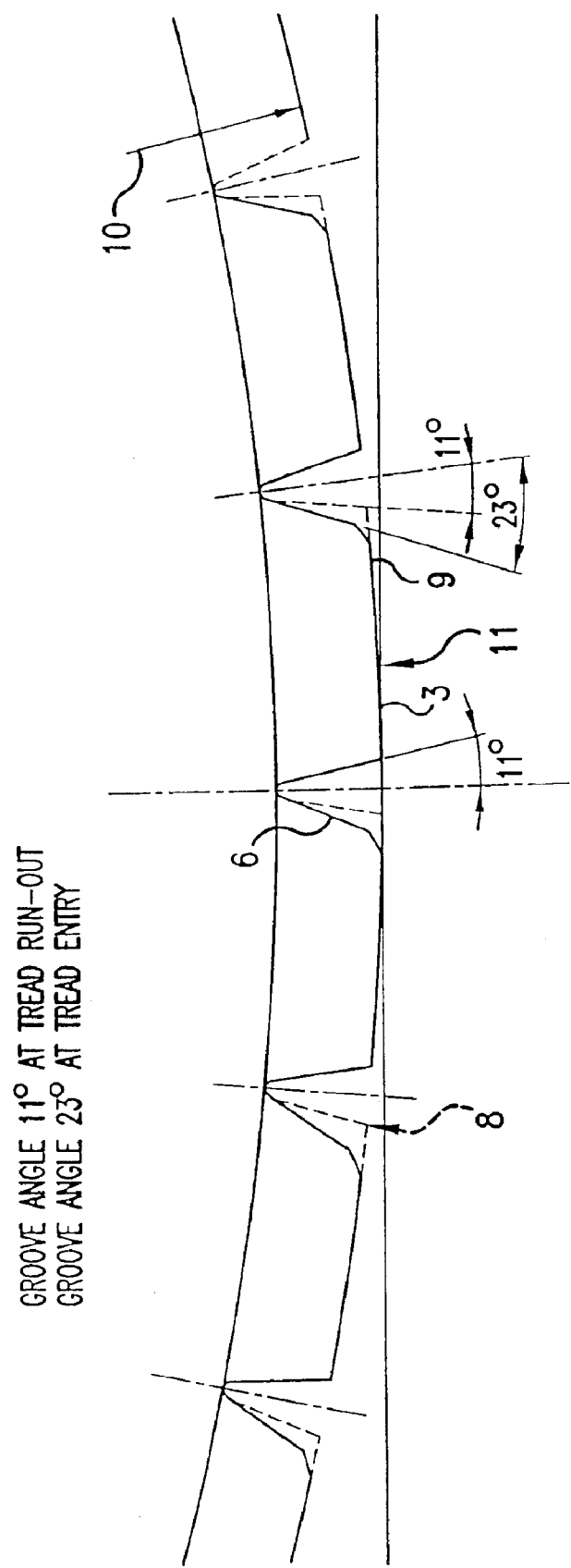

FIG. 6 shows a further embodiment with respect to the tread designs of FIGS. 4 and 5, with a lowering of the tread blocks being provided only at the tread entry side in comparison to the standard tread block shown by a broken line and with the tread block boundary surface 6 being formed by an inclined surface essentially starting from the groove base and a shorter inclined surface of greater inclination achieved by edge cut-off.

REFERENCE NUMERAL LIST

1 Tread block
2 Tread block edges
3 Central plateau
4 Start of lowering
5 Groove base
6 Tread block boundary surface
7 Groove
8 Standard tread block
9 Modified tread block
10 Surface radius
11 Tyre contact patch

What is claimed is:

1. A vehicle tyre having a profiled tread, the tread comprising:

tread blocks separated by grooves, said tread blocks being located in at least some regions of a circumference of the tyre, wherein at least some of the tread blocks include tread block edges, wherein at least the tread block edges running into the tyre contact patch and extending at an angle to the central plane of the tyre are lowered over an entire length thereof with respect to the central plateau of the respective tread block, wherein the contour of the tread block boundary surface extending from a start of the lowering up to the base of the groove extends in section planes parallel to the central plane of the tyre in the form of an extended S-curve, and wherein the curvature of the S-curve continuously changes in accordance with an exponential function y(t) along an entire length of the S-curve, and wherein the exponential function y(t) is defined by the formula:

$$y(t)=a(1-e^{-t/\tau})+b$$

with a parameter a being an amplitude factor of the exponential function y(t), with a parameter b being a distance between the start of the tread block boundary surface and the base of the groove, with a parameter $\tau$ being the distance between the Y-axis and the intersection of the tangent at the tread block boundary surface at t=0 and the line defined by y=a+b, and with t being the tread block length.

2. The vehicle tyre in accordance with claim 1, wherein the tread block edges running out of the tyre contact patch are formed in the same manner as the entry edges.

3. The vehicle tyre in accordance with claim 2, wherein the profiles of the entry and run-out boundary surfaces of the tread blocks, which each have a curvature that continuously changes in accordance with an exponential function are designed differently with respect to their shape and/or inclination.

4. The vehicle tyre in accordance with claim 3, wherein the run-out boundary surfaces extend more steeply than the entry boundary surfaces.

5. The vehicle tyre in accordance with claim 2, wherein the tread block plateau disposed between the entry side and exit side lowerings amounts to approximately 20% to 80% and preferably about 30% to 50% of the block length.

6. The vehicle tyre in accordance with claim 2, wherein the tread block plateau between the start of the entry side and exit side lowering is rectangular or trapezium-shaped in plan view.

7. The vehicle tyre in accordance with claim 1, wherein the steepness of the entry side and/or exit side tread block boundary surface differs over their width.

8. The vehicle tyre in accordance with claim 1, wherein the depth of the grooves which separate the tread blocks from one another in the circumferential direction of the lyre differs in a pre-determinable repetition sequence.

9. The vehicle tyre in accordance with claim 8, wherein a groove of pre-determinable depth is respectively followed by a groove of smaller depth, with a change preferably being provided between a groove of full depth and a groove of half depth.

10. The vehicle lyre in accordance with claim 1, wherein the groove at the entry side defines an angle with respect to the radial direction in the range between 150° and 25° and the groove at the exit side defines an angle with respect to the radial direction in the range from 0° and 13°.

* * * * *